United States Patent [19]
Sackheim et al.

[11] Patent Number: 6,135,393
[45] Date of Patent: Oct. 24, 2000

[54] SPACECRAFT ATTITUDE AND VELOCITY CONTROL THRUSTER SYSTEM

[75] Inventors: Robert L. Sackheim, Rancho Palos Verdes; James S. Bassichis, Playa del Rey; Dale L. Hook, Rancho Palos Verdes, all of Calif.

[73] Assignee: TRW Inc., Redondo Beach, Calif.

[21] Appl. No.: 08/977,759

[22] Filed: Nov. 25, 1997

[51] Int. Cl.[7] .................................. B64G 1/26; F02K 1/00
[52] U.S. Cl. .............................. 244/169; 60/205; 60/257; 60/39.15
[58] Field of Search ................................ 244/169, 158 R; 60/257, 204, 205, 39.15

[56] References Cited

U.S. PATENT DOCUMENTS

| | | | |
|---|---|---|---|
| 4,787,579 | 11/1988 | Smith | 244/169 |
| 5,263,666 | 11/1993 | Hubert et al. | 244/169 |
| 5,282,357 | 2/1994 | Sackheim | 60/204 |
| 5,417,049 | 5/1995 | Sackheim et al. | 60/260 |
| 5,572,865 | 11/1996 | Sackheim et al. | 60/260 |
| 5,651,515 | 7/1997 | Saccoccia et al. | 244/164 |

*Primary Examiner*—J. Woodrow Eldred
*Attorney, Agent, or Firm*—Michael S. Yatsko; Ronald M. Goldman

[57] ABSTRACT

A rocket propulsion system for spacecraft achieves greater economy, reliability and efficiency rocket by incorporating monopropellant RCS thrusters (1a–1f) for attitude control and bipropellant SCAT thrusters (5a–5c) for velocity control. Both sets of thrusters are designed to use the same liquid fuel, supplied by a pressurized non-pressure regulated tank, and operate in the blow down mode. In the propulsion system such station keeping and attitude control thrusters may function in conjunction with a large thrust apogee kick engine, which may also be of the SCAT thruster construction, that uses the same propellent fuel. Hydrazine and Binitrogen tetroxide are preferred as the fuel and oxidizer, respectively. The new system offers a simple conversion of existing monopropellant systems to a high performance bipropellant dual mode system without the extreme complexity and cost attendant to a binitrogen tetroxide—hydrazine bipropellant system.

17 Claims, 4 Drawing Sheets

SPACECRAFT ATTITUDE AND VELOCITY CONTROL THRUSTER SYSTEM

FIELD OF THE INVENTION

This invention relates generally to rocket propulsion systems and, more particularly, to rocket propulsion systems for placing and maintaining spacecraft in planetary orbits. Although the invention has broad application to both manned and unmanned spacecraft, it is particularly concerned with the launch, insertion and maintenance of satellites in geosynchronous orbits.

BACKGROUND

Placing a geosynchronous satellite into orbit typically involves three principal mission phases. First the satellite is placed in low earth orbit not far above the earth's atmosphere, either as part of the payload of a space shuttle vehicle or on a conventional non-reusable rocket vehicle. In the second phase, the satellite orbit has its apogee or highest point raised in altitude by one or more rocket "burns" at a selected point in the orbit, until the apogee is approximately at geosynchronous altitude. Finally, the satellite is given an apogee "kick," i.e. a further rocket burn at apogee that circularizes the orbit at geosynchronous altitude.

Once in orbit, rocket engines are called upon for three additional functions: station keeping, station changes and attitude control, which are sometimes referred to collectively as reaction control system (RCS) functions. Satellites are usually required to maintain a particular "station" with respect to the earth's surface. Moreover, to satisfy requirements of a particular mission, satellites are sometimes required to change from one station to a different station. Changing the satellite to another station obviously requires expenditure of energy. Maintaining a given station also requires the expenditure of energy, even though the orbit is theoretically self-sustaining and geosynchronous. Various factors that create drag and reduce or change the satellites velocity, such as the non-spherical nature of the earth, the gravitational influences of the moon and sun, and so forth, require that the orbit be corrected from time to time if the required station is to be maintained. To make either station keeping corrections or station changes, the station keeping/changing rocket engines provide a "burn" sufficient to slightly change the satellite's velocity. Attitude control is simply the use of multiple rocket engines on the spacecraft to maintain a particular angular attitude or "pointing" of the vehicle. This may be needed, for example, to point an antenna or other sensor at the earth, the sun, or a star.

Unfortunately, the rocket engine performance characteristics required for the various functions of orbital transfer, station keeping/changing and attitude control are not identical.

A figure of merit often used in the comparison of the efficiency of rocket engines is the specific impulse, $I_{SP}$, which is defined as the thrust developed by the engine per unit of propellant weight flow rate. If the thrust is measured in pounds and the flow rate in pounds per second, the units for the measurement of specific impulse are seconds. The specific impulse is somewhat analogous to a miles-per-gallon figure for an automobile, since it measures how much thrust is developed for a unit fuel flow rate.

Another measure of performance is, of course, the thrust force generated by the engine. For the rapid acceleration that is required in a transition to geosynchronous orbit, particularly at the apogee "kick" phase of a mission, an engine with a relatively large thrust is required, perhaps generating up to several thousand pounds of thrust force. The specific impulse, Isp, of such a high thrust engine is also important, and should be in the 300 to 400 second range.

For station keeping and attitude control, high thrust is far less important, since most station-keeping and attitude control maneuvers can be efficiently accomplished with low-thrust burns of the rocket engines. However, fuel economy is very important for rocket engines used in these activities. Hence, the higher the $I_{SP}$, the better. Present monopropellent rockets for these functions achieve an $I_{SP}$ on the order of about 225 to 235 seconds.

Because of the different requirements, earlier propulsion systems involved using multiple fuels and engine systems for the apogee kick and the velocity and attitude control. For example, a solid rocket was used for the apogee kick engine and hydrazine catalytic engines were used for the station keeping/changing velocity and attitude control system thrusters. There is nothing inherently incorrect with that traditional approach, except that the use of two separate propulsion systems weighs more, thereby severely limit the size of the useful payload that can be placed and maintained in orbit, and it costs more.

Some improvement can be obtained using an integrated bipropellant system, in which both the apogee kick engine and the RCS thrusters each use a bipropellant fuel system, such as monomethyl hydrazine (MMH) as the fuel and binitrogen tetroxide ($N_2O_4$) as the oxidizer. Even with that, there is still room for further improvement in the payload that can be placed in orbit for a given mission. Another way to look at the matter is that there is room for improvement in the lifetime that a given spacecraft payload could be maintained in orbit. With a more efficient propulsion system, a greater payload may be maintained in orbit for a given time, or the same payload may be maintained in orbit for a longer time.

To that end, additional propulsion systems were proposed to increase payload efficiency. In U.S. Pat. No. 5,282,357 granted Feb. 1, 1994 to one of the present inventors and owned by the same assignee, a spacecraft rocket propulsion system is disclosed which uses the same fuel for both a bipropellant rocket engine capable of producing high thrust to provide the apogee kick, and one or more monopropellent rocket engines that deliver low thrust, such as the MRE-1 thrusters, for the station keeping and attitude control functions. By employing a common fuel for both the bipropellant and monopropellant rocket engines, the spacecraft is required to stow only one fuel, the Hydrazine, as example, and that reduces weight in comparison to prior systems requiring different fuels and storage vessels, thereby improving propulsion efficiency.

Further, in additional patents U.S. Pat. No. 5,417,049 granted May 23, 1995 and U.S. Pat. No. 5,572,865, granted Nov. 12, 1996, related to the foregoing '357 patent, and issued to one or more of the present inventors, among other things, a new propulsion system is proposed and a new bi-propellant thruster construction is described that has dual mode capability. That thruster construction is presently referred to as a Secondary Combustion Augmented Thrusters or, simply, as a "SCAT" thruster.

A propulsion system is also there presented that employs a bipropellant engine to provide the high thrust apogee kick and the bipropellant SCAT thruster to provide station keeping and attitude control functions. In keeping with the description of '537 patent, both thrusters in that propulsion system use a common fuel, Hydrazine. The bipropellant thruster uses the liquid oxidizer, $N_2O_4$, as the second propellant.

The SCAT thruster uses the same oxidizer to both cool the thruster chamber, whereby the oxidizer is transformed to a gaseous phase, and, in the gaseous phase, as the second propellant for the bipropellant mode of operation. In its construction, the SCAT thruster contains two connected reaction chambers. Liquid propellant fuel, such as hydrazine, is fed into the first chamber where it reacts with a catalyst and enters the gaseous phase in an exothermic reaction, thereby heating the chamber walls, and the reaction propellant gas is propelled by the reaction into a second chamber. Liquid propellent oxidizer is fed through a heat exchanger surrounding the thruster and thereby cools the unit, and the associated energy absorbed by the oxidizer transforms the liquid oxidizer to the gaseous state. The gaseous oxidizer is then routed into the second chamber and mixes with the gaseous propellant fuel entering from the first chamber and reacts with the propellant to create thrust.

Using the two propellants, the SCAT thruster produces an $I_{SP}$ of about 315 to 325 seconds and a thrust $\Delta V$ that is significantly greater than that available from monopropellent RCS thruster. For additional details of construction of the SCAT thrusters, the reader may make reference to the afore cited patents. Such SCAT thrusters are commercially available from TRW Inc., Redondo Beach, Calif., assignee of the present invention.

Using the thermal energy to perform the work of vaporizing the liquid oxidizer instead of the alternative of radiating that thermal energy into space and using an alternative vaporization procedure for the oxidizer obviously somewhat enhances the efficiency of the propulsion process used in the SCAT thruster, an advantage to that engine.

The cooling effect inherent in the SCAT thruster's bipropellant mode of operation raises an additional factor of importance for some spacecraft missions: durability. Heating to high temperatures, particularly to temperatures close to the engine metal's breakdown or melting temperature is corrosive of metals and, if possible, is best avoided. Rockets for velocity and attitude control application are used repeatedly over a mission that may last ten years or more and, therefore, engine durability is important.

Cooling the small monopropellant engines typically used for reaction control functions is difficult due to the engine's small thermal radiating surfaces. Any prolonged use may raise the temperature enough to damage the thrust chamber. Thrust chamber durability can be improved by using more exotic materials, such as Columbium, which generally withstands the four to five thousand degree Fahrenheit temperatures generated in the combustion chamber. That alternative, however, significantly increases construction costs, a decided disadvantage.

Cooling the thrust chamber reduces thermal stress on the metal that forms the chamber walls. The lower operating temperature lessens the need for use of exotic materials and coatings. For a given metal, the metal is more durable at lower temperature and, hence, the engine will last longer. The inherent cooling that occurs in the normal operation of the SCAT engine suggests a longer operational life in comparison to other engines, all other factors being equal, an additional advantage to the engine.

The SCAT thruster is noted as having dual mode capability. It is shown to operate in a bipropellant mode and, alternately in a monopropellent mode. It is now realized that a simple SCAT bi-modal thruster can operate in either a bipropellant mode and achieve an $I_{SP}$ of over 315 seconds, or, alternatively, can operate in a monopropellant mode and achieve an $I_{SP}$ of about 225 seconds.

The SCAT thruster is described in the two cited patents as useful for station keeping/changing and attitude control functions of the propulsion system, and the patents thereby propose the SCAT thruster as a substitute for the monopropellant RCS thrusters in the single fuel rocket propulsion system earlier described in the '357 patent, in which those thrusters serve as a companion to the high thrust apogee kick rocket engine. For one, the substitution reduces propellant weight and thereby increases the payload size carried on a mission.

Despite the apparent advantage of the dual mode SCAT engine, Monopropellant rockets, such as the wide range of catalytic thrusters available today in the industry, despite their lower performance, remain the engine of choice for station keeping and attitude control functions in satellite systems. The designs of those monopropellant rockets are space proven; its performance is predictable, it has been reliable; and it offers none of the uncertainty of a new product for the satellite designer. Those advantages apparently outweighed the superior performance offered by the SCAT thrusters. The requirements for many space flight missions offered neither motive or incentive to change to another rocket engine for station keeping and attitude control application and the lack of industry acceptance suggests the proposed substitution as overly ambitious and/or illusory advantage.

Notwithstanding such discouragement, an important aspect of the present invention is a propulsion system that relies on the SCAT engine as the important component, providing weight savings with no significant compromise in reliability and hardware compatibility, and offering an advantage of two modes of operation, but one which does not eliminate RCS monopropellent rockets. The present invention retains the benefit and advantage of the monopropellent thrusters and adds the advantage of SCAT thrusters in satellite propulsion systems.

Accordingly, an object of the present invention is to provide a novel, highly reliable and more efficient propulsion system suitable for geosynchronous and other high-energy mission spacecraft programs.

And an additional object of the invention is to provide a simple means to obtain high performance by converting a monopropellant system to a dual mode monopropellant and bipropellant system that avoids the extreme complexity and cost increase attendant to binitrogen tetroxide—hydrazine type bipropellant systems.

SUMMARY OF THE INVENTION

The present invention divides the attitude control functions from the velocity control functions. The attitude control functions are served by the monopropellant rockets as in the prior propulsion system. Velocity control is served exclusively by the bipropellant SCAT engines operated in bipropellant mode.

Briefly, and in general terms, the propulsion system of the invention comprises a liquid fuel bipropellant high-thrust apogee kick engine or other high-thrust engine, a plurality of SCAT thrusters for station keeping control, that is, velocity control, a liquid fuel tank and an oxidizer tank connected to the high-thrust engine and SCAT thrusters, and a like plurality of monopropellant reaction control thrusters for attitude control. The monopropellant thrusters are connected to the same liquid fuel tank and use the same fuel as the high-thrust apogee kick engine and the SCAT thrusters to provide a substantial saving in propellant weight and propulsion system inert weight for given mission requirements.

The present invention provides a simple, minimum cost, minimum complexity, high reliability approach to substitute for and replace existing simple low performance blowdown monopropellant hydrazine reaction control system in the velocity control function with a higher performance bipropellant RCS while continuing with a monopropellant hydrazine reaction control system for the attitude control function.

Significant performance increase is obtained with almost no change in RCS operating modes and with the same basic operating conditions, ie. Blowdown pressurization, wide mixture ratio excursions, passive system cooling, and with no unusual or extra fluid components, such as regulators and check valves.

Further, since velocity control and attitude control need not be operated simultaneously, as an added feature, the bipropellant SCAT engines are operated in a monopropellant mode to backup the monopropellant rockets. The mode of the bipropellant SCAT engine is switched, as and if needed, to monopropellant mode to join with the monopropellant engines to effect the attitude adjustment or, if the monopropellant engines are found inoperative, as a backup to alone perform the attitude control adjustment. When needed for velocity control, the control system switches the bipropellant engines to their bipropellant mode and achieve the higher thrust.

The maximum achievable performance for a satellite catalytic velocity control thruster, the monopropellant thruster, is characterized by a deliverable maximum specific impulse, Isp, of about 225 seconds. Direct substitution of a bimodal bipropellant thruster, referred to as SCAT, increases the velocity control maximum specific impulse to about 325 seconds. As a consequence of that alone, weight savings of velocity control propellant, such as Hydrazine, of almost 45% is achieved.

The foregoing and additional objects and advantages of the invention together with the structure characteristic thereof, which was only briefly summarized in the foregoing passages, becomes more apparent to those skilled in the art upon reading the detailed description of the preferred embodiments, which follows in this specification, taken together with the illustration thereof presented in the accompanying drawings.

DETAILED DESCRIPTION OF THE PREFERRED EMBODIMENTS

Figure 1:
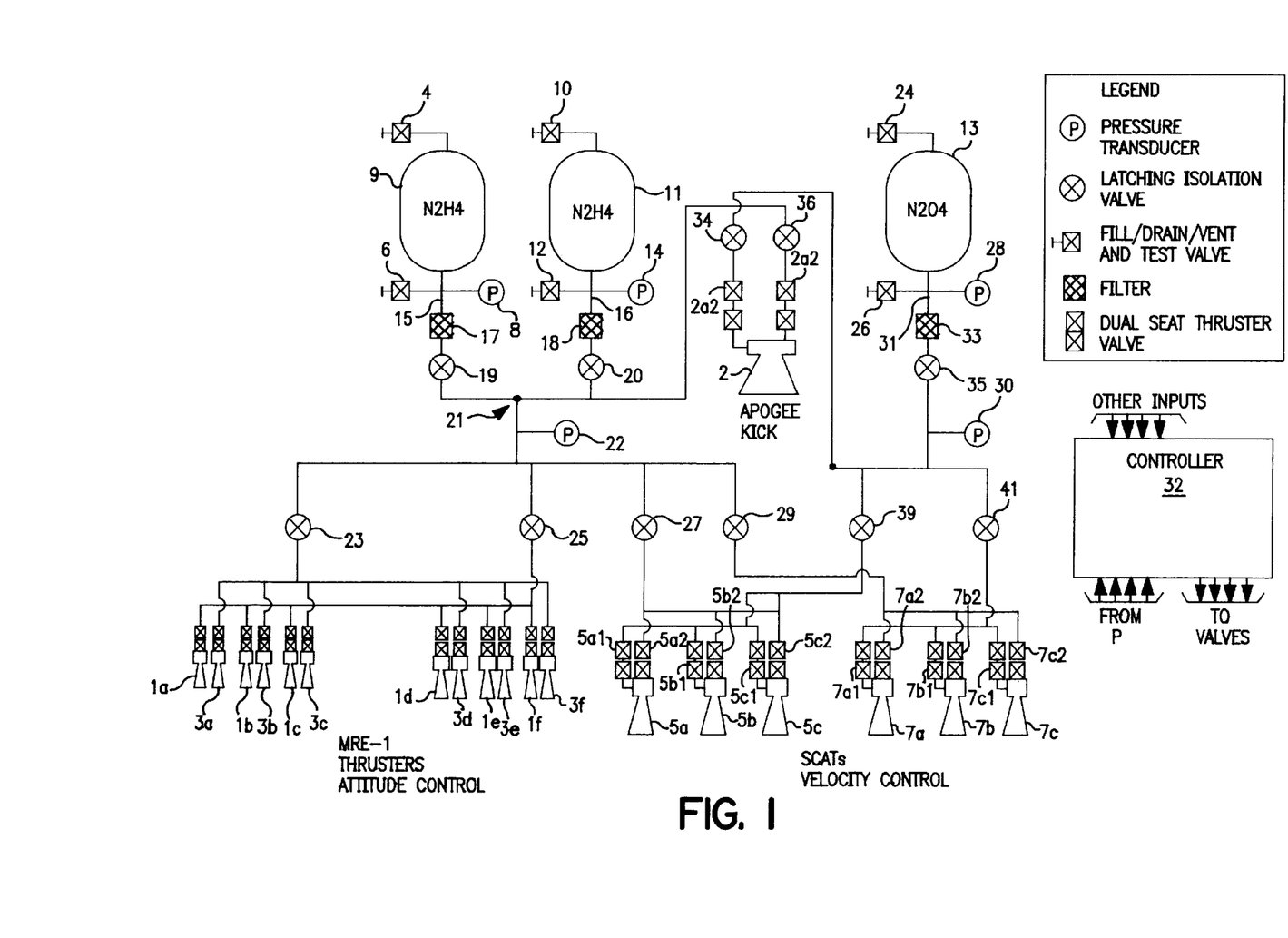
FIG. 1 schematically illustrates an embodiment of the invention.

Reference is made to the embodiment presented in the schematic of FIG. 1 illustrating a propulsion system incorporating the invention. The propulsion system contains six (or more) monopropellant thrusters, 1a through 1f, six additional monopropellant thrusters 3a through 3f, which, as becomes apparent, are provided as a backup to the first set of monopropellant thrusters, three bipropellant SCAT thrusters 5a, 5b and 5c, an additional three bipropellant SCAT thrusters 7a, 7b and 7c, also included preferably as a backup to the first set of bipropellant thrusters, and a high thrust apogee kick engine 2. Propellent fuel tanks 9 and 11 are provided to store the liquid fuel, suitably Hydrazine, N2H4, for both sets of thrusters, and a propellent oxidizer tank 13 is included to store the liquid oxidizer, suitably bi-nitrotetroxide, $N_2O_4$. The fuel and oxidizer tanks are non-pressurized, since all thrusters described operate in the simple "blowdown" mode.

A fuel conduit 15, represented by a line, leads from the outlet end of fuel tank 9 to the series connection of a fuel filter 17, an electrically operated latching isolation valve 19, one arm of a "T" connection 21, and branches to each of latching isolation valves 23 and 25. Fuel inlet valve 4 and fuel drain and/or test valve 6 are connected, respectively, to the inlet and outlet ends of tank 9, and a pressure transducer 8 is connected to the outlet side of the tank.

Similar plumbing and control valves are provided for fuel tank 11, which is plumbed in parallel to fuel tank 9 and serves as an alternative or additional fuel source. The outlet of tank 11 is connected by conduit 16 through a fuel filter 18, latching isolation valve 20 to an arm of T-connection 21. A fuel inlet valve 10 is connected to the inlet of tank 11, and a drain valve 12 and pressure transducer 14 are connected to the outlet end of that tank.

A pressure transducer 22 is connected to monitor the pressure at T-connection 21 and the outlet side of valves 19 and 20. From T-connection 21, the fuel conduit branches in parallel to each of valves 23 and 25, associated, respectively, with monopropellant thrusters 1a through 1f, and monopropellant thrusters 3a through 3f. The fuel conduit also extends to valves 27 and 29 associated, respectively, with SCATs 5a–5c and 7a–7c.

A conduit 31 connects the outlet of liquid oxidizer tank 13 through a filter 33 and latching control valve 35 to the input of a T-connection 37. From one arm of that T-connection the conduit extends through another latching control valve 39, and from the other arm of that T-connection to still another latching control valve 41. A fill valve 24 connects to the tank's inlet, a drain/test valve 26, connects to the tank's outlet. A pressure transducer 28 connects to the tank outlet and another pressure transducer 30 connects at the outlet side of control valve 35.

The output end of latching control valve 39 is connected via a conduit in parallel to the oxidizer dual seat thruster valves 5a1, 5b1 and 5c1 for SCAT thrusters 5a, 5b and 5c, respectively; and the output of latching control valve 41 is similarly connected via a conduit in parallel to the oxidizer dual seat thruster valves 7a1, 7b1 and 7c1 for SCAT thrusters 7a, 7b and 7c, respectively.

The outlet of control valve 27 connects via fuel conduit to the fuel dual seat thruster valves 5a2, 5b2 and 5c2, associated respectively with SCAT's 5a, 5b, and 5c; and, likewise the outlet of control valve 29 connects via fuel conduit to the fuel dual seat thruster valves 7a2, 7b2 and 7c2, associated respectively with SCAT's 7a, 7b, and 7c.

The foregoing constitutes the essentials of the station keeping velocity control thruster system and attitude control thruster system of a satellite. It is appreciated that the satellite also customarily includes another bipropellant thruster 2, referred to as the "apogee kick" engine, referred to in earlier in the background to this invention, which, although not necessary to an understanding of the present invention, is illustrated for completeness. Tanks 9, 11 and 13 also respectively supply the fuel and oxidizer to the bipropellant apogee kick engine 2, normally included on the satellite. A conduit from the fuel tanks is spliced into the conduit to T-connection 21 and extends to latching isolation valve 36 and therefrom to dual seat thruster valve 2a2 for feeding fuel to engine 2. An oxidizer conduit is also spliced into conduit 31 and supplies oxidizer to latching isolation valve 34. The output of that valve is coupled to dual seat thruster valve 2a2 through which the oxidizer is fed to engine 2.

Controller 32 is the satellite propulsion controller. It is a known programmed microcontroller or computer device which provides programmed outputs when it receives predetermined inputs from various sensors, including the pressure transducers forming part of the propulsion system. The satellite controller performs many of the housekeeping functions and propulsion system command and control operations on board the satellite. It checks the pressure transducers. It receives the inputs from other sensors and apparatus in the satellite and/or from ground control that call for propulsion system action, such as a change in velocity and/or a change in attitude, and commands those actions. It interprets the received information, makes appropriate selections and issues commands to external apparatus based on the interpretations made.

When the action sought is to change the attitude of the satellite to a new attitude, controller 32 initiates operation of the valves associated with the monopropellant thrusters to operate one or more of the thrusters for the a preprogrammed interval of time determined by the controller's program. And if thereafter the controller determines that the final orientation is not quite correct, it determines the additional amounts of thrust necessary to make the corrections and then initiates operation of the appropriate thrusters for another preprogrammed time interval, repeating the procedure until the new attitude is properly attained. This entire maneuver sequence can also be implemented open loop through a human ground controller. The ground control commands firing until the correct attitude is sensed by the spacecraft and reported back to the ground controller.

Each SCAT thruster typically produces a thrust that is at least fifty per cent greater than thrust typically produced by a monopropellant RCS thrusters, and the SCAT thruster satisfies the large thrust requirements needed for changing the satellites velocity. Information on satellite velocity is likewise obtained and assessed and an appropriate command is issued by the controller to those velocity thrusters, which are operated as appropriate, until the satellite achieves the prescribed velocity. The controller also functions to operate valves 34, 36, 2a1 and 2a2 and fire apogee kick engine 2 as desired in the same made of operation used in the prior system, which, therefor, need not be discussed in detail.

As those skilled in the art understand, the elements of the foregoing system are all known components. The described valves are all electrically operated and are under control of controller 32. Electrical leads, not illustrated, are connected from each valve to an input of Controller 32. Each of the pressure transducers are also electrically operated and via appropriate electrical leads, not illustrated in the figures, provide electrical signals, representing fluid pressure, to respective inputs of controller 32. That information is received by the controller and is inspected by the controller's program to monitor liquid pressure, determine the amount of liquid remaining in each tank, and whether the liquid is present in the propulsion stage being monitored. From that information obtained from pressure transducers 8 and 14, the controller determines which fuel tank to open or whether to open both fuel tanks when the controller receives the appropriate command to change attitude and/or velocity, and then supplies the appropriate electrical signals to the valves associated with the respective fuel tanks.

For velocity control, controller 32 selects and actuates valve 19 and/or 20 and valve 27 to release fuel into the SCAT's 5a–5c; and selects and actuates valves 35 and 39 to release oxidizer to those same SCAT's. The controller also operates thruster valves 5a1, 5a2, 5b1, 5b2, 5c1 and 5c2 to release fuel and oxidizer into the SCAT engines. With that fuel and oxidizer received at the SCAT engine's intakes, the SCATs operate in bipropellant mode to produce thrust, a greater level of thrust than produced by the monopropellant thrusters. When the satellite achieves the desired velocity, the control circuit 32 recloses those valves.

Controller 32 retains in memory the temperature and pressure indications characteristic of a satisfactory firing, and, during operation the controller compares the temperature and pressure indications monitored in the present firing with that stored criteria. Should any or all of SCAT thrusters 5a–5c be inoperative, controller 32, having determined an out of specification firing, instead operates valves 29 and 41 and valve pairs 7a1 and 7a2, 7b1 and 7b2, and/or 7c1 and 7c2 associated with SCAT thrusters 7a, 7b and 7c, respectively, and the backup SCAT thrusters supply the requisite thrust.

For attitude control, controller 32 selects and actuates valves 19 and/or 20 and valve 23, associated with monopropellant thrusters 1a–1c. With the fuel received at its intake the monopropellant thrusters produce thrust. The controller monitors the satellites attitude error, and that error decreases to zero, when the selected attitude is attained, at which time the controller 32 re-closes the valves. Should any one or more of monopropellent MRE thrusters be inoperative, the attitude error monitored by the controller increases, instead of decreasing. In response to the increasing attitude error, controller 32 instead selects and actuates valves 19 and/or 20 and valve 25. And monopropellent thrusters 3a–3f supplies the requisite number of thruster pulse mode firings.

As an advantage, if an RCS thruster and its backup thruster fails in service, one of the SCAT thrusters can be operated in a monopropellant mode to produce the requisite thrust for the attitude control operation. As example, assuming attitude control thrusters 1a and 1d fails and its backup thrusters 3a and 3d also fails. In such a situation, controller 32 operates valve 27 and valve 5b2 admitting only propellant into SCAT 5a. Valves 39 and 35 to the oxidizer remain closed. SCAT 5a operates in monopropellant mode, generating the request low thrust. The thrust level generated in the monopropellant mode is essentially the same as that generated by the RCS thrusters. This matches the thrust produced by the other monopropellant thrusters which are still active.

In this bipropellant mode the SCAT thrusters provide the same essential efficiency and effectiveness as the former station keeping thruster systems that incorporate only monopropellant thrusters. As a further advantage, if for any reason the oxidizer becomes depleted prematurely, either by consumption or through valve failure, it is appreciated that the SCAT thrusters will continue to operate in monopropellant mode to provide appropriate lower levels of thrust for either or both attitude and velocity control functions.

The foregoing rocket propulsion system operates in the simple blow-down mode. It does not require the use of a high pressure tank and pressure regulator. The SCAT engine performs irrespective of the combination of fuel and oxidizer pressures that may result during operation of the system. However, as the inlet pressures vary from the optimum, the engine's $I_{SP}$ decreases.

From the foregoing description, modifications of the foregoing system and in the manner in which the system may be used become apparent to those skilled in the art. As example, for a bare bones cost reduced design achieving greater weight savings, one might elect to eliminate the separate apogee kick engine from the satellite and employ the SCATs to provide the apogee kick, in addition to their velocity control function.

Figure 2:
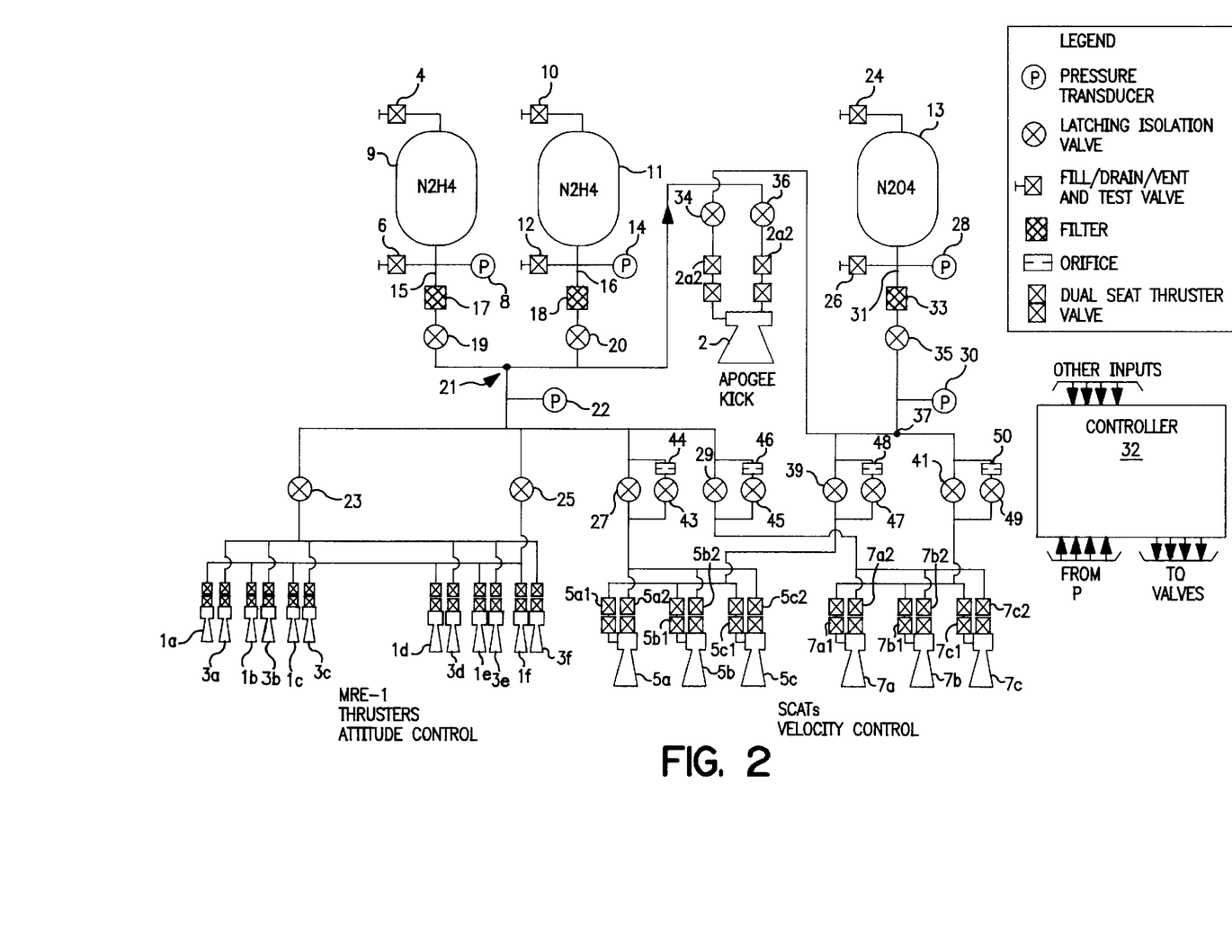
FIG. 2 schematically illustrates an alternative embodiment.

A simple technique to improve operating conditions, regardless of how the propulsion system has been operated previously, that is, irrespective of whether the propellant pressures are the same or one pressure is higher than the other due to propellant usage during the course of the mission, is illustrated schematically in the embodiment of FIG. 2 to which reference is made. For convenience the elements earlier presented in FIG. 1, which are incorporated within this embodiment, are, for convenience, denominated with the same numeric designation earlier used for that element and the description of those elements is not repeated. As inspection of FIG. 2 makes apparent for the most part the propulsion system is the same as before and operates in essentially the same way.

A difference is that each of the fuel and oxidizer thruster inlets to the SCAT's is equipped with a second isolation valve and a series connected orifice that is connected in shunt of the existing valve. Specifically series connected orifice and latching isolation valve 43 are spliced in the fuel conduit circuit in shunt of valve 27; series connected orifice 48 and latching isolation valve 47 are spliced in the oxidizer conduit circuit in shunt of valve 39; series connected orifice 46 and latching isolation valve 45 are spliced in the fuel conduit circuit in shunt of valve 29; and series connected orifice 50 and latching isolation valve 49 are spliced into the oxidizer conduit circuit in shunt of valve 41. The orifices add a line pressure drop to the associated fluid conduit.

In this embodiment, the operating conditions are improved regardless of how the propulsion system has been operated previously. That is, irrespective of whether the fuel and oxidizer pressures are the same or if one pressure is higher than the other due to propellant usage throughout the mission. Each thruster inlet leg is equipped with parallel isolation valves. One valve in each leg is orificed to add a line pressure drop. Before each thruster is fired, the tank pressures are evaluated by the controller 32, and the proper set of isolation valves is opened in each leg to provide optimum pressures and, hence, optimum performance.

Taking SCAT 5$a$ as an example, if the fuel pressure sensed by transducer 22 is below a prescribed maximum, controller 32 operates valve 27 to supply the fuel to the SCAT. Valve 43 remains closed. However, if the pressure is found to be too high, the controller instead selects and operates valve 43, which contains the series connected orifice. The orifice drops the pressure in the fuel line to the SCAT and the fuel is supplied to the SCAT at the lower pressure through that valve, while valve 27 remains closed. A like evaluation is independently made of the oxidizer pressure. If too high, the controller selects the alternative oxidizer path through the orificed valve. The foregoing evaluation and selection is individually made and applied to each of the SCAT engines.

In normal operation of this alternative embodiment, the SCAT's are modulated by the controller to produce thrust in short bursts. Essentially, the thruster is turned on and off for momentary periods. That is, controller 32 will operate and close a fuel and oxidizer valve for a predetermined period, during which the rocket produces thrust, and then re-closes those valves, terminating the rocket's thrust. A period of time later, the procedure is repeated. Before each thruster is fired, the controller conducts an evaluation of the fuel and oxidizer pressures and determines whether an adjustment is necessary. It then operates the proper isolation valves in each leg to provide optimum pressures and, hence, optimum performance.

Again using SCAT 5$a$ as an example, if the fuel pressure and oxidizer pressure are both too high, as determined by the controller, the controller initiates operation of valves 43 and 47, which are orificed, leaving the associated parallel valves 27 and 29 closed, thereby providing a lower pressure fluid stream to the SCAT via respective thruster valves 5$a$1 and 5$a$2. When, during the course of the modulation operation, the controller determines that the fuel and oxidizer pressures has sufficiently reduced to a predetermined level, it then discontinues operation of the orificed valves, 43 and 47, and instead operates the valves in parallel with each, 27 and 39, respectively. If the controller instead determines that only the fuel pressure is too high, then it selects and initiates operation of valve 43 to supply the fuel to the thruster at lower pressure, leaving valve 27 closed, and selects valve 39 to supply the oxidizer to that thruster, leaving the orificed valve 47 unoperated. Although the foregoing example is given for SCAT 5$a$, the same action occurs for each of the remaining SCAT thrusters 5$b$ and 5$c$, or, alternatively, 7$a$ through 7$c$, should the backup thrusters be in use, and their associated supply valves.

As one appreciates some spacecraft propulsion systems may mount two SCAT thrusters straddling the spacecraft center of gravity and requires the firing of both thrusters simultaneously to achieve the change in velocity. To correct for any slight mismatch or imbalance in the thrusters performance or alignment or center of gravity offsets or any combination of the foregoing as might result in unacceptable spacecraft attitude disturbance levels, ie. rotation, thrust modulation is required. To enable modulation, a flow by-pass can be incorporated in each SCAT valve in either the embodiment of FIG. 1 or the embodiment of FIG. 3. Such addition is illustrated in the partial schematic of FIG. 3 to which reference is made.

Figure 3:
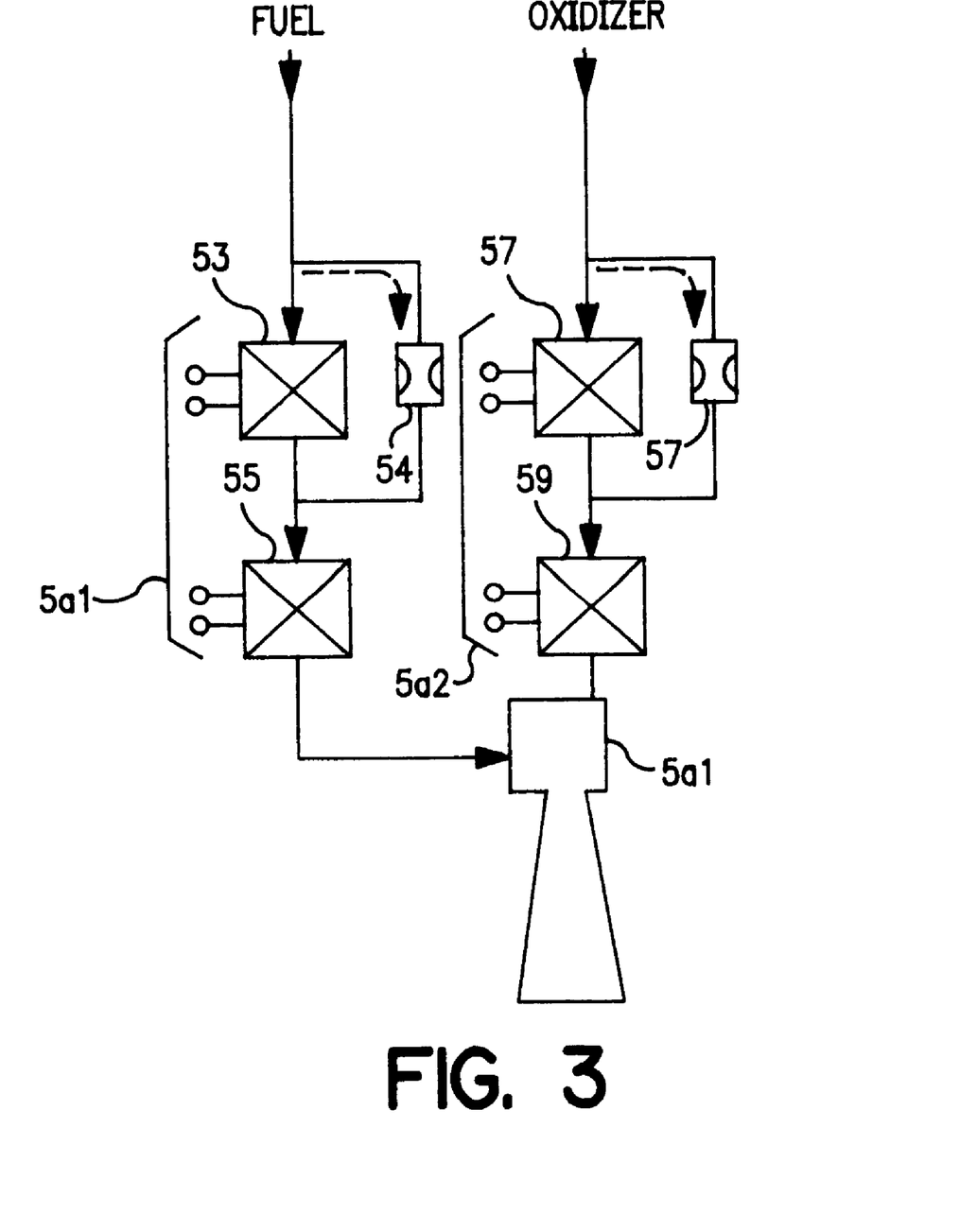
FIG. 3 schematically illustrates a modification to the embodiment of FIG. 1 used to construct a still additional embodiment of the invention.

In the embodiment of FIGS. 1 and 2, the dual seat thruster valve, as example, valve 5$a$1, is actually formed of two electrically operated valves connected in series fluid circuit and those two valves are essentially electrically slaved together in operation. That is, controller 32 provides the "on" or "off" control signals to both valves simultaneously to simultaneously open or close the valves, respectively permitting fluid flow or not. In the embodiment of FIG. 3, however, the two valves, although remaining connected in series fluid circuit, are operated independently of one another.

A flow bypass is obtained for the fuel with two thruster control valves 53 and 55 are connected in fluid series and a flow limiting bypass orifice 54 is connected in bypass of valve 53 and another flow bypass is obtained for the oxidizer with two thruster control valves 57 and 59 connected in fluid series and a bypass orifice 56, connected in bypass of valve 57. Each of the valves in controlled by controller 32 by appropriate electrical signals over electrical wiring, not illustrated, to those valves. To assist understanding of the embodiment, the foregoing illustrates the combination for only one of the SCAT engines 5$a$1, but it is understood that a like combination is used for each of the remaining SCAT engines as well.

The combination of valve with an orifice in shunt is essentially a variable flow restrictor having a photographic like variable diameter central opening that contains a minimum diameter opening when the valve is unenergized and therefore closed, so as to allow passage of some fluid, despite the valve being closed, and expands to a maximum diameter opening when the valve is energized, allowing maximum fluid to pass.

In this embodiment, controller 32 includes a program that allows the bipropellant SCAT thruster to produce a lower average thrust even while operating in a bipropellant mode so as to permit the SCAT thruster to serve as an attitude adjusting rocket even in that mode. In the attitude adjusting mode, the controller applies signals to each of valves 55 and 59 in the respective fuel and oxidizer serial inlet circuits, opening those valves, and, simultaneously, provides a signal periodically and in synchronism to the other valves 53 and 57 in those two chains to periodically open and close valves 53 and 57 simultaneously. With valves 53 and 57 open, full thrust is developed by the associated SCAT thruster 5a1. With valves 53 and 57 closed, a more limited flow of the respective fuel and oxidizer is provided through the respective orifices 54 and 56, essentially choking the fuel and oxidizer flow, and the associated SCAT engine develops a reduced thrust level during the interval in which the valves 53 and 57 are closed. The effect is to provide a pulsing type thrust.

The foregoing SCAT based propulsion flow bypass approach provides the same thrust modulation capabilities for attitude disturbance compensation as the standard practice of thruster "off-pulse" modulation used for all standard hydrazine and bipropellant during simultaneous two thruster delta V firings. The foregoing modification enables full thrust modulation with minimum hardware complexity or change in existing system design. Up to thirty per cent thrust modulation is achieved by choking off fuel and oxidizer flows to the SCAT.

It will be appreciated from the foregoing that the invention represents a significant advance in the field of rocket propulsion systems. The invention does not require the use of a high pressure tank and pressure regulator. The system operates in a simple blowdown mode. The SCAT engines run at whatever combination of fuel and oxidizer pressures dictated by the control system. As the inlet pressures vary from the optimum design point, the Isp gets lower.

Additional modifications become apparent to those skilled in the art. As example, the oxidizer used in the preferred propulsion system is nitrogen tetroxide ($N_2O_4$). However in other embodiments liquid oxygen, nitrogen trifluoride ($NF_3$), nitrogen tetrafluoride ($N_2F_4$) or combinations of these substances may be substituted.

Reference is made to FIGS. 4a, 4b, 4c and 4d for a comparison of four types of propulsion systems, including that of the present invention, for a typical mission. The total cargo weight placed into a transfer orbit between a low earth orbit and a geosynchronous orbit, assumed to be the same for all three cases, namely 11,600 pounds. The mission includes the use of an apogee kick engine to effect a transfer to geosynchronous orbit, and an assumed life of ten years of station keeping and attitude control activities.

Figures 4A, 4C:
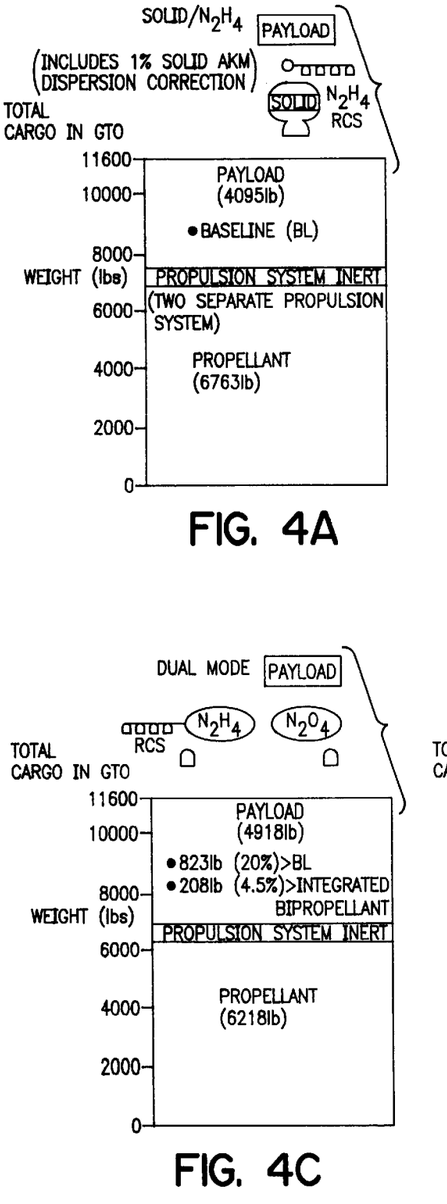
FIGS. 4a, 4b, 4c, and 4d are comparison charts illustrating examples of payloads for various propulsion systems and the present invention.

In a conventional approach, shown on the left of the figure and indicated at FIG. 4(a), a solid-fuel rocket is used for the transfer to geosynchronous orbit, and multiple hydrazine catalytic thrusters are used for station keeping and attitude control duties. The total propellant load is calculated at 6,763 pounds. The remaining component of the total weight of the vehicle is the inert propulsion system weight, calculated at 742 pounds. The payload delivered to the orbit, exclusive of remaining fuel and inert propulsion component, is 4,095 pounds.

Figures 4B, 4D:
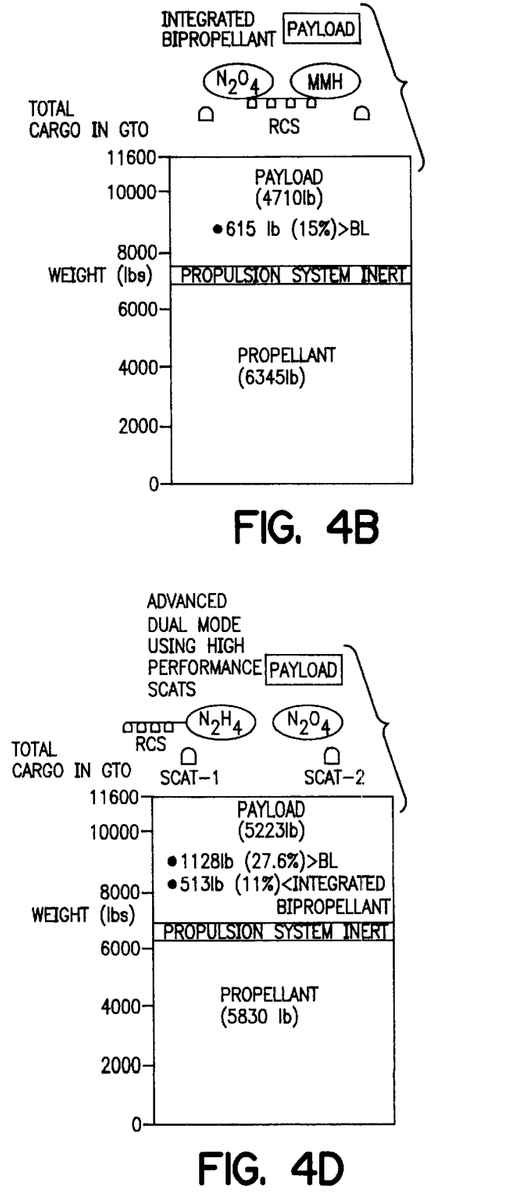

In an integrated bipropellant propulsion system, indicated at FIG. 4(b), the same fuel is used in all phases of the mission, namely monomethyl hydrazine (MMH) with nitrogen tetroxide ($N_2O_4$) as the oxidizer. The propellant requirements are reduced to 6,345 pounds and the inert propulsion system component is reduced to 545 pounds. Therefore, the payload is increased by about 15%, to 4,710 pounds.

In the propulsion system proposed in the prior patent U.S. Pat. No. 5,572,865, earlier discussed, as indicated at FIG. 4(c), pure hydrazine ($N_2H_4$) is used as the fuel for both phases of the mission, but is used in a bipropellant mode for the apogee kick phase, and in a monopropellant mode with electrical or chemical augmentation in the station keeping and attitude control phase. The total propellant weight is reduced to 6,218 pounds, and the inert component weight to 464 pounds. The payload is increased to 4,918 pounds, an increase of about 20% over the conventional propulsion system of FIG. 4(a).

In the propulsion system of the present invention using the high performance SCAT thrusters, as indicated at FIG. 4(d) pure hydrazine is used as the fuel in each phase of the mission. The total propellant weight now reduces to 5,830 pounds, and the inert component weight is 457 pounds. The payload is thereby increased to 5,223 pounds. This payload is now about 28% more than the original base line and an 11% gain over the payload to orbit of FIG. 4(c) enabled by the propulsion system proposed in U.S. Pat. No. 5,572,865.

It is appreciated that the foregoing system is a very simple and expeditious substitute for existing monopropellant systems and allows conversion of such monopropellant systems to a high performance bipropellant dual mode thruster system without the extreme cost and complexity of a Bi-Nitrogen tetroxide and Hydrazine bipropellant system.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An attitude and velocity control propulsion system for a space craft comprising:

monopropellent thruster means, said monopropellant thruster means, including a fuel inlet, for producing thrust in response to fuel supplied at said fuel inlet;

bipropellant secondary combustion augmented thruster means, said bipropellant secondary combustion augmented thruster means including a fuel inlet and an oxidizer inlet for producing a thrust responsive to both fuel supplied at said inlet and oxidizer supplied simultaneously at said oxidizer inlet and for producing a lesser thrust responsive to fuel supplied at said fuel inlet;

fuel tank means for storing propellant fuel in liquid form;

oxidizer tank means for storing propellant oxidizer in liquid form;

first valve means for coupling said fuel from said fuel tank means to said monopropellent thruster means;

second valve means for coupling fuel from said fuel tank means to said bipropellant secondary combustion augmented thruster means;

third valve means for coupling oxidizer from said oxidizer tank means to said oxidizer inlet of said bipropellant secondary combustion augmented thruster means;

controller means for selectively operating said second and third valve means, wherein said secondary combustion augmented thruster means produces a thrust to change the velocity of said space craft, and for selectively operating said first valve means, wherein said monopropellant thruster means produces a thrust to change the attitude of said space craft.

2. The invention as defined in claim 1, wherein said controller means further includes: means for receiving a command to change spacecraft velocity and selection means for selecting said second and third valve means for operation, responsive to receiving a command to change spacecraft velocity, and for alternatively selecting said first valve means for operation, responsive to receiving a command to change spacecraft attitude.

3. The invention as defined in claim 2, wherein said controller means further includes:

means for determining inoperability of said first valve means and for selecting said second valve means for operation responsive to receiving a command to change space craft attitude when said first valve means is inoperative, wherein said bipropellant secondary combustion augmented thruster means operates in monopropellant mode to produce thrust to change space craft attitude.

4. The invention as defined in claim 1, further comprising:

orifice means and fourth valve means, said orifice means and fourth valve means being connected in series across said second valve means for producing a fuel pressure drop and providing an alternative fuel route from said fuel tank means to said bipropellant secondary combustion augmented thruster means;

second orifice means and fifth valve means, said second orifice means and fifth valve means being connected in series across said third valve means for producing an oxidizer pressure drop and providing an alternative oxidizer route from said oxidizer tank means to said bipropellant secondary combustion augmented thruster means;

first pressure transducer means for monitoring fuel pressure of said fuel tank means;

second pressure transducer means for monitoring oxidizer pressure of said oxidizer tank means;

and wherein said controller means includes:

means for monitoring each of said pressure transducer means to determine fuel pressure and oxidizer pressure;

means for receiving a command to change space craft velocity and generating a velocity change command; and pressure dependent selection means, responsive to a command to change spacecraft velocity, for selectively operating one of said second and fourth valve means in dependence upon whether the pressure of said fuel tank means is respectively at or below a predetermined fuel pressure level or, alternatively, is greater than said predetermined fuel pressure level, and for selectively concurrently operating one of said third and fifth valve means in dependence upon whether the pressure of said oxidizer tank is respectively at or below a predetermined oxidizer pressure level or, alternatively, is greater than said predetermined oxidizer pressure level, wherein said secondary combustion augmented thruster means produces a thrust to change the velocity of said space craft.

5. The invention as defined in claim 1, wherein said fuel comprises Hydrazine ($N_2H_4$); and wherein said oxidizer comprises Bi-Nitrogen Tetroxide, ($N_2O_4$) wherein said SCAT thruster means comprises at least three secondary combustion augmented thrusters; and wherein said monopropellant thruster means comprises at least three monopropellant thrusters; and further comprising:

orifice means and fourth valve means, said orifice means and fourth valve means being connected in series across said second valve means for producing a fuel pressure drop and providing an alternative fuel route from said fuel tank means to said fuel inlet of said bipropellant secondary combustion augmented thruster;

second orifice means and fifth valve means, said second orifice means and fifth valve means being connected in series across said third valve means for producing an oxidizer pressure drop and providing an alternative oxidizer route from said oxidizer tank means to said oxidizer inlet of said bipropellant secondary combustion augmented thruster;

first pressure transducer means for monitoring fuel pressure of said fuel tank means;

second pressure transducer means for monitoring oxidizer pressure of said oxidizer tank means; and wherein said controller means further includes:

means for monitoring each of said pressure transducer means to determine fuel pressure and oxidizer pressure;

means for receiving a command to change space craft velocity and generating a velocity change command;

command receiving means for receiving a command to change space craft velocity and for receiving a command to change space craft attitude;

pressure dependent selection means, responsive to a command to change spacecraft velocity, for selectively operating one of said second and fourth valve means in dependence upon whether the pressure of said fuel tank means is respectively at or below a predetermined fuel pressure level or, alternatively, is greater than said predetermined fuel pressure level, and for selectively concurrently operating one of said third and fifth valve means in dependence upon whether the pressure of said oxidizer tank is respectively at or below a predetermined oxidizer pressure level or, alternatively, is greater than said predetermined oxidizer pressure level, wherein said secondary combustion augmented thruster means produces a thrust to change the velocity of said space craft; and means for selecting said first valve means for operation, responsive to receiving a command to change space craft attitude.

6. The invention as defined in claim 1, wherein said bipropellant secondary combustion augmented thruster means includes:

secondary combustion augmented thruster fuel inlet valve means for controlling fuel flow into said bipropellant secondary combustion augmented thruster means under command of said controller means; and secondary combustion augmented thruster oxidizer inlet valve means for controlling oxidizer flow into said bipropellant secondary combustion augmented thruster means under command of said controller means.

7. The invention as defined in claim 6, wherein said SCAT thruster fuel inlet valve means further comprises:
first and second fuel inlet valves connected in series; and
wherein said secondary combustion augmented thruster oxidizer inlet valve means further comprises:
first and second oxidizer inlet valves connected in series.

8. The invention as defined in claim 7, further comprising:
flow limiting bypass orifice connected in shunt of said first inlet fuel valve means to permit a limited flow of fuel to said second fuel inlet valve when said first fuel inlet valve is closed; and
flow limiting oxidizer bypass orifice connected in shunt of said first inlet oxidizer valve means to permit a limited flow of fuel to said second oxidizer inlet valve when said first oxidizer inlet valve is closed.

9. The invention as defined in claim 8, wherein said controller means includes means for operating said second fuel inlet valve to close said second fuel inlet valve and for simultaneously periodically operating said first fuel inlet valve to periodically close and open said first fuel inlet valve; and means for operating said second oxidizer inlet valve to close said second oxidizer inlet valve and for simultaneously periodically operating said first oxidizer inlet valve in synchronism with said first fuel inlet valve to periodically close and open said first oxidizer inlet valve, whereby said bipropellant secondary combustion augmented thruster produces thrust that alternates between two thrust levels.

10. The invention as defined in claim 4, wherein said bipropellant secondary combustion augmented thruster means includes:
secondary combustion augmented thruster fuel inlet valve means for controlling fuel flow into said bipropellant secondary combustion augmented thruster means under command of said controller means;
secondary combustion augmented thruster oxidizer inlet valve means for controlling oxidizer flow into said bipropellant secondary combustion augmented thruster means under command of said controller means;
said secondary combustion augmented thruster fuel inlet valve means comprising:
first and second fuel inlet valves connected in series;
said secondary combustion augmented thruster oxidizer inlet valve means comprising:
first and second oxidizer inlet valves connected in series; and further comprising:
flow limiting bypass orifice connected in shunt of said first inlet fuel valve means to permit a limited flow of fuel to said second fuel inlet valve when said first fuel inlet valve is closed; and
flow limiting oxidizer bypass orifice connected in shunt of said first inlet oxidizer valve means to permit a limited flow of fuel to said second oxidizer inlet valve when said first oxidizer inlet valve is closed;
said controller means including means for operating said second fuel inlet valve to close said second fuel inlet valve and for simultaneously periodically operating said first fuel inlet valve to periodically close and open said first fuel inlet valve; and means for operating said second oxidizer inlet valve to close said second oxidizer inlet valve and for simultaneously periodically operating said first oxidizer inlet valve in synchronism with said first fuel inlet valve to periodically close and open said first oxidizer inlet valve, whereby said bipropellant secondary combustion augmented thruster produces thrust that alternates between two thrust levels.

11. The invention as defined in claim 5, wherein each said secondary combustion augmented thruster includes:
secondary combustion augmented thruster fuel inlet valve means for controlling fuel flow into said bipropellant secondary combustion augmented thruster under command of said controller means, said secondary combustion augmented thruster fuel inlet valve means comprising first and second fuel inlet valves connected in series;
secondary combustion augmented thruster oxidizer inlet valve means for controlling oxidizer flow into said bipropellant secondary combustion augmented thruster means under command of said controller means, said secondary combustion augmented thruster oxidizer inlet valve means comprising:
first and second oxidizer inlet valves connected in series;
a first flow limiting bypass orifice connected in shunt of said first inlet fuel valve means to permit a limited flow of fuel to said second fuel inlet valve when said first fuel inlet valve is closed; and
a second flow limiting oxidizer bypass orifice connected in shunt of said first inlet oxidizer valve means to permit a limited flow of fuel to said second oxidizer inlet valve when said first oxidizer inlet valve is closed;
said controller means including means for operating said second fuel inlet valve to close said second fuel inlet valve and for simultaneously periodically operating said first fuel inlet valve to periodically close and open said first fuel inlet valve; and means for operating said second oxidizer inlet valve to close said second oxidizer inlet valve and for simultaneously periodically operating said first oxidizer inlet valve in synchronism with said first fuel inlet valve to periodically close and open said first oxidizer inlet valve, whereby said bipropellant secondary combustion augmented thruster produces thrust that alternates between two thrust levels.

12. In a space craft rocket propulsion system, an attitude and velocity control propulsion system comprising:
monopropellent thruster means, said mono propellant thruster means having a fuel inlet for producing first level thrust in response to receiving propellant fuel at said fuel inlet;
bipropellant secondary combustion augmented thruster means, said bipropellant secondary combustion augmented thruster means including a fuel inlet and an oxidizer inlet for producing a second level thrust responsive to receiving both fuel and oxidizer at said respective fuel and oxidizer inlets and for alternatively producing a first level thrust responsive to only receiving fuel at said fuel inlet said second level thrust being at least fifty per cent greater than said first level thrust;
liquid fuel tank means for storing fuel in liquid form;
liquid oxidizer tank means of storing oxidizer in liquid form;
first valve means for coupling fuel from said liquid fuel tank means to said inlet of said monopropellant thruster means;

second valve means for coupling fuel from said liquid fuel tank means to said fuel inlet of said bipropellant secondary combustion augmented thruster means;

third valve means for coupling oxidizer from said liquid oxidizer tank means to said oxidizer inlet of said bipropellant secondary combustion augmented thruster means; and controller means for operating said first valve means to produce first level thrust to effect a change of space craft attitude and for alternatively operating said second and third valve means for producing second level thrust to effect a change of space craft velocity.

13. In a space craft rocket propulsion system, an attitude and velocity control propulsion system comprising:

monopropellent thruster means for producing a first level thrust to produce a change in spacecraft attitude; and bipropellant secondary combustion augmented thruster means for producing a second level thrust to produce a change in spacecraft velocity, said second level thrust being at least fifty per cent greater than said first level thrust.

14. The spacecraft rocket propulsion system of claim 13, further comprising: bipropellant thruster means for producing a third level thrust to produce a change in spacecraft apogee, said third level thrust being greater than said second level thrust.

15. The spacecraft rocket propulsion system of claim 13, further comprising propellent reservoir means consisting of a propellant liquid fuel reservoir and a propellant liquid oxidizer reservoir; oxidizer delivery means for selectively coupling oxidizer to said bipropellant thruster means and to said bipropellant secondary combustion augmented thruster means; and fuel delivery means for selectively coupling fuel from said liquid fuel reservoir to said bipropellant thruster means, said bipropellant secondary combustion augmented thruster means and said monopropellent thruster means.

16. Rocket apparatus for producing a pulsating thrust comprising in combination:

bipropellant rocket engine means for producing thrust, said rocket engine means having a fuel inlet and an oxidizer inlet;

an engine controller;

fuel inlet valve means connected to said fuel inlet for controlling fuel flow into said bipropellant rocket engine means under command of said engine controller;

oxidizer inlet valve means connected to said oxidizer inlet for controlling oxidizer flow into said bipropellant SCAT thruster means under command of said engine controller;

said fuel inlet valve means comprising:

first and second fuel inlet valves connected in series; said oxidizer inlet valve means comprising:

first and second oxidizer inlet valves connected in series;

flow limiting bypass orifice connected in shunt of said first inlet fuel valve means to permit a limited flow of fuel to said second fuel inlet valve when said first fuel inlet valve is closed; and flow limiting oxidizer bypass orifice connected in shunt of said first inlet oxidizer valve means to permit a limited flow of fuel to said second oxidizer inlet valve when said first oxidizer inlet valve is closed;

said controller including means for operating said second fuel inlet valve to close said second fuel inlet valve and for simultaneously periodically operating said first fuel inlet valve to periodically close and open said first fuel inlet valve; and means for operating said second oxidizer inlet valve to close said second oxidizer inlet valve and for simultaneously periodically operating said first oxidizer inlet valve in synchronism with said first fuel inlet valve to periodically close and open said first oxidizer inlet valve, whereby said bipropellant rocket engine produces thrust that alternates between two thrust levels.

17. The invention as defined in claim 16, wherein said bipropellant rocket engine comprises a secondary combustion augmented thruster.

* * * * *